March 2, 1965  W. R. BENNETT, JR  3,172,057
GASEOUS OPTICAL MASER
Filed April 12, 1962  3 Sheets-Sheet 1
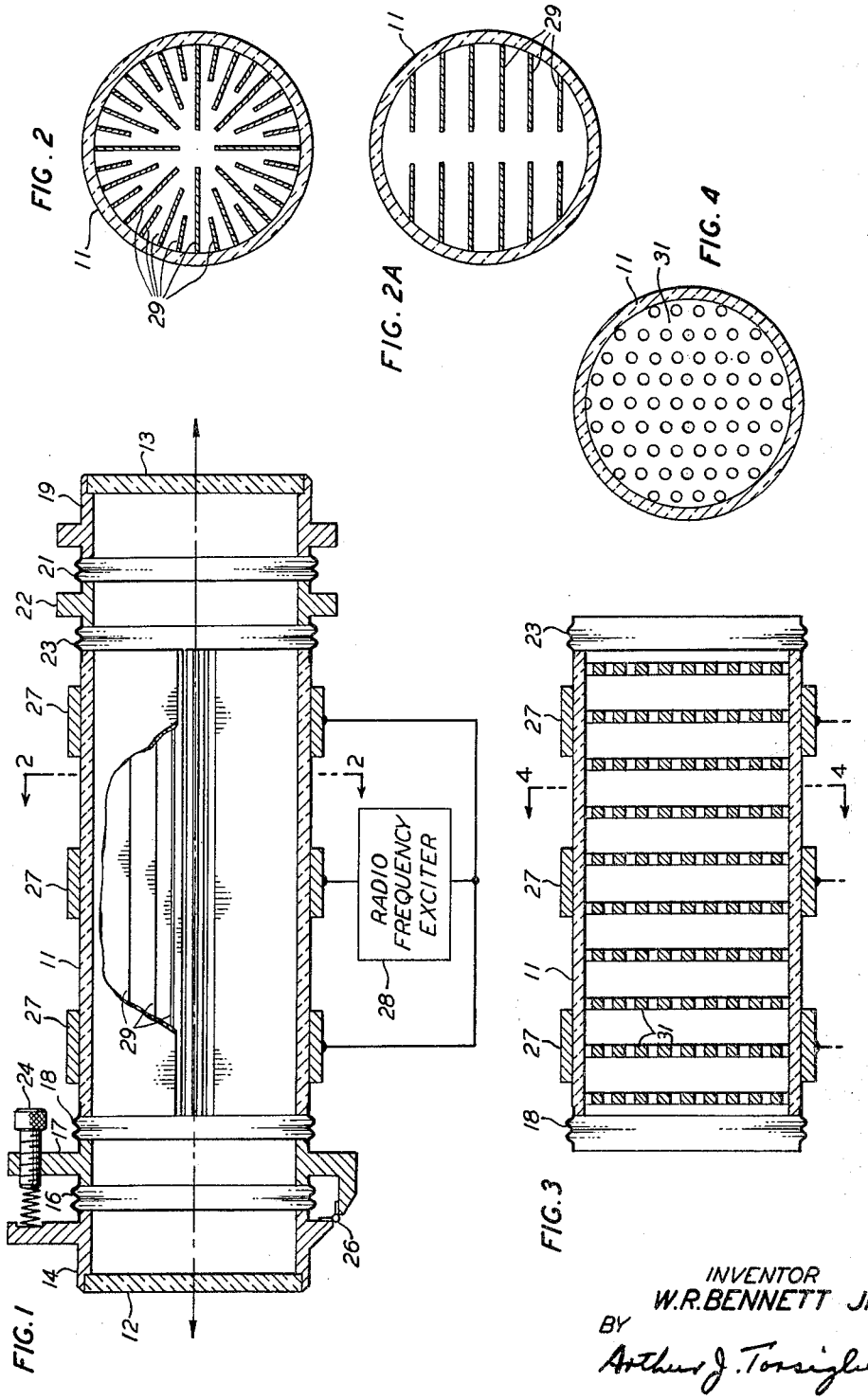
INVENTOR
W.R.BENNETT JR.
BY
Arthur J. Torsiglieri
ATTORNEY

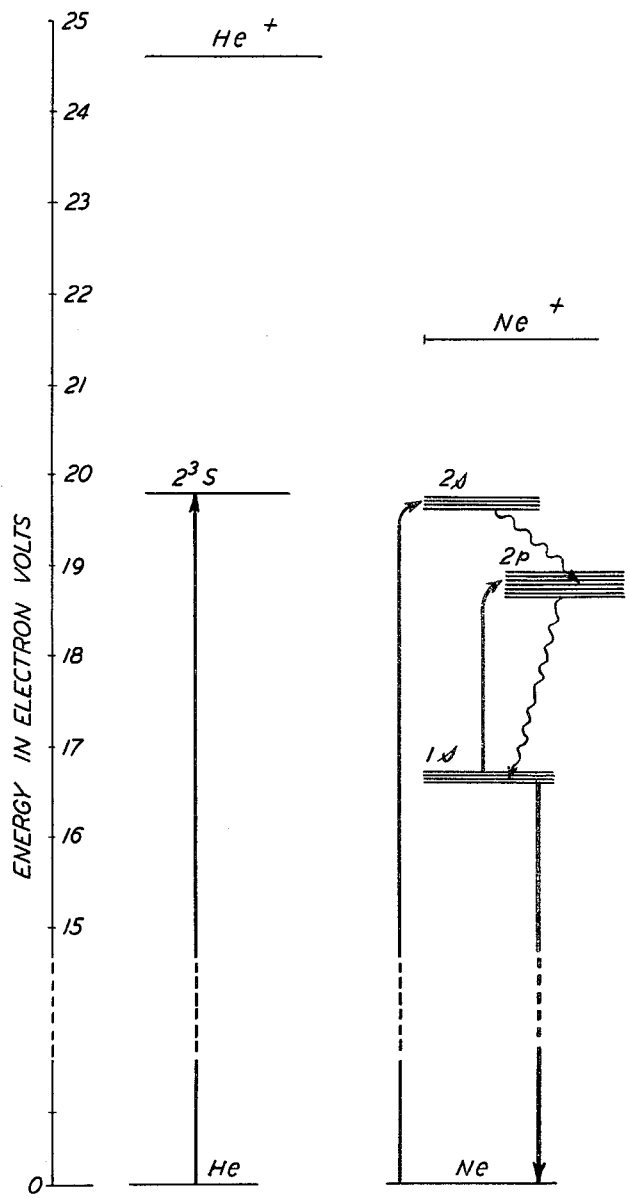

March 2, 1965 W. R. BENNETT, JR 3,172,057
GASEOUS OPTICAL MASER
Filed April 12, 1962 3 Sheets-Sheet 3

INVENTOR
W. R. BENNETT JR.
BY
ATTORNEY 3,172,057
GASEOUS OPTICAL MASER
William R. Bennett, Jr., Berkeley Heights, N.J., assignor to Bell Telephone Laboratories, Incorporated, New York, N.Y., a corporation of New York
Filed Apr. 12, 1962, Ser. No. 186,886
15 Claims. (Cl. 331—94.5)

My invention relates to optical masers and, more particularly, to optical masers employing gases as active media.

A preferred type of optical maser employs as an active medium a gas having an energy level system characterized by a plurality of distinct electron energy levels, at least two of which have a separation corresponding to an optical frequency. One type of gas suitable for use in optical masers of the type disclosed in U.S. Patent 2,929,922 to Schawlow and Townes, for example, is characterized by at least three successively higher energy levels which, for convenience, may be designated $E_1$, $E_2$, and $E_3$. The separation of $E_3$ from $E_2$ corresponds to the frequency of the optical wave to be generated or amplified. Advantageously, the probabilities of the allowed transitions between the various levels and the lifetimes of the excited states are so related that a population inversion may be produced between at least a pair of levels. Maser operation in an exemplary three-level gas is obtained by optical pumping of electrons from lower levels to $E_3$ or to higher levels from which they relax spontaneously to $E_3$. When the population of $E_3$ exceeds that of $E_2$ a population inversion or negative temperature is produced. This condition corresponds to a nonequilibrium distribution of the electron population between energy levels $E_3$ and $E_2$. It is well known that the population distribution may be stimulated to return to equilibrium conditions by wave energy of the frequency corresponding to the separation between the inverted pair of energy levels. The return transition is accompanied by the emission of wave energy of the same frequency as the stimulating signal, in accordance with Bohr's relation $$\nu = \frac{E_3 - E_2}{h}$$

In addition, the stimulated emission is coherent and in phase with the signal so that amplification results. If a portion of the amplified wave is fed back into the active medium as by reflection, oscillation may be produced.

Excitation of gaseous optical maser media by optical pumping, although effective, is a relatively inefficient process. This is so because the wave energy required to raise electrons to the upper energy level is typically of a frequency higher than that of the stimulated emission. A medium having an energy level system as simple as that described above, for example, may be pumped by light with a frequency matching the separation between ground state and $E_3$. In addition, the absorption lines of gases at the pressures typically employed in optical masers are very narrow, necessitating a rather close coincidence between them and the emission lines of the pump source. However, the best available sources of light energy of a frequency suitable for optically pumping a particular medium are incoherent sources which also produce light at many other frequencies throughout the spectrum. Although the intensity of the light output of gas discharge lamps, for example, may be increased by raising the pressure of the gas, this results in an unfortunate broadening of the emission lines and, eventually, to a reversal of the spectrum. Thus, a great portion of the energy used to drive the pump source appears as light which does not contribute to the desired population inversion and, in fact, may interfere with the maser process. Large amounts of energy must, therefore, be expended to produce a sufficient intensity in the useful frequency range. The high total energy densities which result may cause severe thermal problems as well as other difficulties.

The inefficiency of available sources for optical pumping and the difficulties experienced with such sources have stimulated efforts to develop alternative means for pumping optical masers. One approach widely considered in this regard is based on the fact that the population distribution among the energy levels of a gas may be altered by subjecting the gas to an energetic beam of atomic or sub-atomic particles. Basically, this approach is subject to the same type of difficulty encountered in optical pumping: the interaction of the particle beam with the gas may take a number of different forms, many of which do not contribute to, or actually interfere with, the result desired. Such expedients may be adopted as carefully controlling the velocity of particles in the beam and providing for selection of properly excited gas atoms from the bulk of the medium. For example, apparatus has been devised for producing population inversions by the spatial or temporal separation of atoms in the desired energy state from atoms in other energy states.

A radically different solution to the problem discussed above is disclosed in copending patent application Serial No. 277,651, filed May 2, 1963, as a continuation in part of Serial No. 816,276, filed May 27, 1959, by Ali Javan and now abandoned. This application is assigned to the assignee hereof. The active medium of Javan's optical maser comprises a mixture of two carefully chosen gases, A and B. The gas A has an energy level system characterized by a metastable level $E_1$ above the ground state $E_0$. The gas B has an upper energy level $E_3'$ whose separation from its ground state $E_0'$ matches that of the metastable $E_1$ in the first gas. In addition, the gas B has energy levels $E_1'$ and $E_2'$ intermediate the upper level $E_3'$ and the ground state $E_0'$. The intermediate level $E_2'$ and the upper level $E_3'$ are optically connected. Application of a radio frequency field to the gaseous mixture causes partial ionization of gas A and the production of relatively high-energy free electrons. The electrons collide with the uni-ionized particles of gas A, exciting them to higher energy states. In particular, the particles of gas A tend to accumulate in the metastable state $E_1$ as a result of both direct excitation and relaxation from higher levels to which they were initially excited. The free electrons also collide with and excite particles of gas B.

When particles of gas A in the metastable state collide with unexcited particles of gas B, energy is resonantly transferred due to the matching of the energy levels $E_1$ and $E_3'$. That is, the collisions are inelastic "collisions of the second kind." As a result of this selective excitation of the upper level $E_3'$ of gas B, a population inversion is produced between $E_3'$ and the intermediate level $E_2'$. It has been found that, in addition to exciting gas A to an energy state which matches an upper state of the gas B, the free electrons tend to interact in other ways with the gaseous mixture. More particularly, the free electrons may tend to inhibit the efficient formation of the desired population inversion either by promoting interactions which increase the population of the intermediate energy level $E_2'$ in the gas B, or by accelerating processes which tend to return the system to thermal equilibrium. Such effects tend to limit the amplification of the stimulating signal by reducing the gain per unit length in the maser medium. While gain limitations of this nature may be overcome to some extent by using a longer cavity resonator filled with the active medium, optical masers of great length are difficult to fabricate and inconvenient to use. In addition, the mechanical requirements dictated by the need for precisely aligned optical components become progressively more difficult to satisfy as the length of the device is increased. Although a long optical path may be compressed into a relatively short physical length by the use of reflectors, such elements inevitably introduce losses and complexities which tend to offset the advantages derivable in principle. Furthermore, as the length of the cavity is increased, the frequency separation between adjacent resonant modes is decreased. As a result, there is increased interference between simultaneously oscillating modes. This interference, which also varies with the power in a mode, adds to the noise in the output beam. High power, low noise operation of an optical maser is, therefore, preferably achieved in a cavity of relatively short length.

An object of my invention, therefore, is a gaseous optical maser having a relatively high gain per unit length in the active medium.

Another object of my invention is to counteract processes in the active medium of a gaseous optical maser which tend to inhibit the maintenance of a population inversion between a selected pair of energy levels.

It is also an object of my invention to provide a gaseous optical maser having both a relatively high gain per unit length and a relatively high power output.

These and other objects of my invention are realized in a particular illustrative embodiment thereof comprising a bounded volume enclosing a gaseous optical maser medium. A pair of transparent windows define the ends of an optical path through the medium so that a light signal introduced into the volume at one window may travel through the medium and interact therewith, to emerge in amplified form at the other window. Means are provided for generating free electrons within the bounded volume for colliding with gas particles therein to produce a population inversion between a selected pair of energy levels. In another embodiment, adapted to function as an oscillator, the transparent windows are replaced by semireflecting plates to form an optical cavity resonator.

It is a feature of the invention that a plurality of members are positioned within the bounded volume containing the gaseous medium to increase the solid surface area in contact therewith. The members provide extended interaction surfaces in addition to the interior surface of the means forming the simple geometrical bounds of the enclosed gas-containing volume. In prior art type devices the bounded volume is typically a circular cylinder. In accordance with the principles of the invention the surface enlarging members are designed and oriented to have a minimal transverse cross-section in the light path through the active medium. The members are advantageously designed to minimize any interference with the free movement of electrons and excited gas particles throughout the volume, so that the required population inversion may be established in all regions thereof. In addition, the members are adapted to provide a minimum of interference with close coupling of the optical wavefronts in the various regions of the volume.

The above-mentioned as well as other objects and features of the invention will be fully understood from the following more detailed discussion taken in conjunction with the accompanying drawing in which:

FIG. 1 is a longitudinal cross-section of an optical master in accordance with the invention;

FIG. 2 and FIG. 2A are cross-sectional views of two variations of the embodiment shown in FIG. 1, taken along the line 2—2;

FIG. 3 is longitudinal cross-section of the gas tube used in a second illustrative embodiment of the invention;

FIG. 4 is a cross-sectional view of the optical maser shown in FIG. 3 taken along the line 4—4;

FIG. 5 depicts, in diagrammatic form, the pertinent parts of the energy level systems of helium and neon which form the active medium of one illustrative embodiment.

Figure 8:
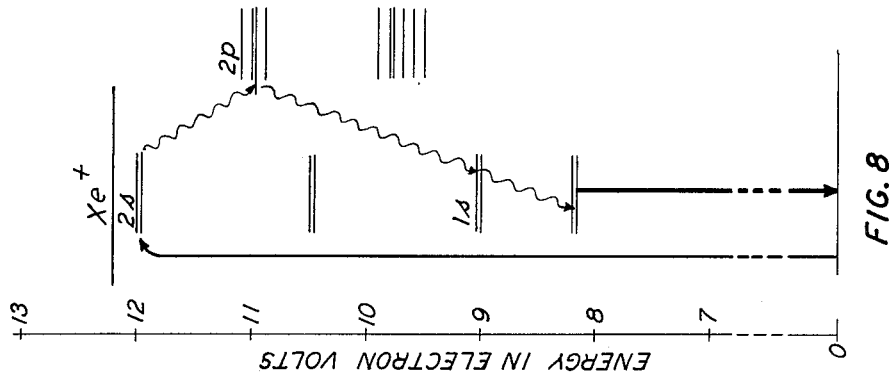
FIGS. 6, 7 and 8 represent the relevant portions of the energy level systems of argon, krypton and xenon, useful as active media in optical masers embodying the invention.

Referring now to the drawing, there is shown in FIG. 1 and optical maser in accordance with the invention comprising a gas-tight bounded volume defined by a cylindrical tube 11 and transparent end plates 12 and 13. The end plate 12 is mounted in a first supporting ring 14 which is connected by a flexible bellows 16 to a second ring 17. The ring 17 is in turn connected to the tube 11 by a bellows 18. In like manner, the end plate 13 is mounted in a support ring 19 which is connected to the tube 11 by means of a first bellows 21, a ring 22, and a second bellows 23. The end assemblies permit the tube 11 to expand and contract during operation of the device without affecting the separation and alignment between the plates 12 and 13. For example, if the entire device is supported by external mounting means attached to the rings 17 and 22, the alignment of the plate 12 may be adjusted by means of a micrometer screw 24 which causes the ring 14 to pivot on a hinge 26. In the embodiment shown in FIG. 1, the thumbscrew 24 controls the verticle alignment of the plate 12, while a similar arrangement (not shown in the drawing) at the opposite end of the device controls the horizontal alignment of the plate 13. A plurality of electrodes 27, which encircle the tube 11 and are connected to a radio frequency source 28, are provided for producing an electrical discharge in a gaseous active medium contained therein.

One type of gaseous optical maser medium disclosed in the above-mentioned application of A. Javan comprises a mixture of helium and neon, the energy level systems of which are depicted schematically in FIG. 5. In Javan's helium-neon maser a radio frequency excitation produces an electrical discharge in the gaseous mixture. The resulting free electrons collide with helium atoms, exciting them to the $2_3S$ level (LS notation), the energy of which substantially matches that of the $2s$ levels of neon (Paschen notation). Due to the correspondence of these energy states, the collision cross-section between He ($2^3S$) and Ne is very large and energy is readily transferred from the helium to the neon. At the same time, some of the free electrons in the discharge collide with neon atoms and excite them to energy state above the ground state. Some of the neon atoms are excited in this manner from the ground state to the $2s$ levels, the net result of this process being to enhance the population inversion between the $2s$ and the $2p$ levels. Maser action is produced by stimulated transitions from the $2s$ to the $2p$ levels, which are optically connected. The $2p$ levels are depopulated principally by radiative transitions to the metastable $1s$ levels which thus tend to increase greatly in population.

It has been found that some of the collisions between free electrons and neon atoms result in the excitation of neon from the metastable $1s$ levels to the $2p$ levels. It can be seen that this process tends to reduce the magnitude of the population inversion between the $2s$ and $2p$ levels. The relative probabilities of the two types of excitation which result from direct collisions between free electrons and neon atoms are such that maser action in pure neon has not been heretofore achieved. In the past, optical maser action in neon has been produced only with the aid of the resonant transfer of energy from an auxiliary gas, such as helium, which has an upper energy level substantially matched to the neon 2s levels. Similar undesirable collision mechanisms have so far prevented the use in this type of optical maser of gases such as argon, krypton and xenon for which no suitable auxiliary gas has been found.

In order to support a population inversion of sufficient magnitude to result in optical maser action, the electron energy level system of a gas must satisfy a number of conditions. Thus, the upper maser level must have a large electron excitation cross-section. This generally implies that the upper level must be strongly connected optically to the ground state, or at least that they be connected optically through a change in electron spin. Additionally, the lower maser level must have a small electron excitation cross-section. This generally implies that the lower level must not decay radiatively by strong transitions to the ground state. However, the lower level must have a high rate of decay to levels other than the ground state. In fact, unless the total decay rate of the lower level exceeds the spontaneous decay rate of the upper level to the lower, it is considered impracticable to maintain the necessary population inversion.

A further condition on the maser levels is that the transition probability between the upper and lower levels must be among the strongest of the partial transition probabilities for transitions originating in the upper state. That is, the gain at frequencies corresponding to these transitions, for a given magnitude of inversion, will be largest. This condition determines the preferred transitions within a given pair of excited state groups.

This invention is based on my discovery that the population of the metastable 1s level in neon may be maintained at a very low level by promoting a high rate of collisions between neon atoms in the 1s state and the solid walls of the gas-filled chamber. Such collisions are believed to depopulate the metastable level by transferring the excitation energy to the wall itself or, perhaps, by detaching an excited electron from the gas particle to produce a free electron and a positive ion. With the contribution of these interactions a number of gases, for which no auxiliary gases are known, can be made to satisfy the conditions set forth above.

The rate of ionizing collisions between the walls and gas particles in the metastable state is at an optimum when the separation between the walls is about equal to the mean free path of the particles. I have discovered that, for optical maser gas tubes having inside diameters greater than the optimum, gain per unit length is approximately proportional to the reciprocal of the diameter. In this context, "gain" is to be understood as referring to the average gain across the diameter of the gas tube. In general, the diameters required for maximum gain per unit length are inconveniently small, being on the order of a few millimeters. As the volume of active medium contained in such a tube is very small the total power output is quite limited.

In the optical maser illustrated in FIG. 1 a relatively high gain per unit length and total power output are achieved by using a gas tube 11 having a diameter much larger than has heretofore been deemed desirable. Prior devices described in the literature, for example, have employed gas tubes having diameters of from one to two centimeters. In accordance with the principles of my invention, however, the tube 11 may have a diameter many times as large, provided that measures are taken to promote collisions of undesirable metastable particles with a solid surface. To this end, there is provided a plurality of fin-like members 29 atttached to the inner wall of the tube 11 and extending radially toward the center thereof. It is preferred that the spacing between the surfaces of adjacent fins be approximately equal to the mean free path of particles in the metastable state to be depopulated.

In order to facilitate excitation of the required electrical discharge throughout the entire volume of the tube 11, it is considered desirable that the various volume segments defined by the members 29 be interconnected so as to permit the penetration of free electrons and excited particles. The elemental volume segments should also be interconnected in such a manner as to promote the close coupling of coherent optical wavefronts across the diameter of the gas tube. FIG. 2, which is a cross-sectional view of the optical maser shown in FIG. 1, taken along the line 2—2, illustrates a preferred arrangement of the fins 29. Adjacent fins are of different lengths, so that the optimum spacing is preserved between the surfaces as they converge toward the center of the tube 11. The fins 29 extend longitudinally along the tube 11 so that a light beam may travel a straight-through path between the end plates 12 and 13. In addition, the members 29 are quite thin so as to present a minimal area transverse to the optical wavefront. An alternative arrangement of fins is illustrated in FIG. 2A. A plurality of fins 29, spaced apart by the proper distance and parallel to each other, extend the length of the tube 11. The fins 29 are slotted to provide a central opening for the purposes described above. In a typical embodiment, the tube 11 and the fins 29 are of a material, such as fused quartz, which is resistant to thermal stresses and does not contaminate the gaseous medium.

The arrangements of fins shown in FIGS. 2 and 2A permit close coupling of all parts of the optical wavefront as it travels through the tube 11. In a third illustrative embodiment, depicted in FIG. 3, the interaction surface required by the invention is provided by a plurality of spaced perforated plates 31. The holes in the plates 31 are of a diameter substantially equal to the mean free path of the particles which are to interact with the surface thereof, and the plates 31 are separated by a like distance. The holes should be rather closely spaced so that the plates 31 present a relatively small cross sectional area transverse to the tube 11. Obstruction of the light beam is thus maintained at a low level. FIG. 4 illustrates a suitable arrangement of perforations in the plates 31, which are aligned so that the holes are in register, thereby defining a plurality of straight-through light paths between the windows 12 and 13. In this embodiment coupling of the parts of the optical wavefront is achieved primarily by the diffraction of light waves in the gaps between the windows 12 and 13 and the nearest of the plates 31, although some diffraction coupling occurs in the spaces between adjacent perforated plates in the array.

In accordance with my invention, stimulated emission may be achieved from a gaseous medium consisting essentially of pure neon. In an embodiment employing neon at a pressure between 0.1 and 0.3 mm. Hg, the interior surfaces of the gas tube are advantageously spaced by about 2 mm. While the optimum spacing is quite close to the mean free path of the Ne metastables, operation is possible when the spacing is as much as two, three, or four times the mean free path. In general, it is considered desirable that the spacing be no more than about 4 times the mean free path of the particles which are to interact with the solid surfaces inside the tube.

The maser transitions in pure neon are the same ones which operate in the He-Ne system. In addition, a number of the 2s–2p transitions in pure argon, krypton and xenon can be utilized under the proper conditions. Transitions in these gases which meet the criteria discussed above are listed, together with their wavelengths, in Table I in order of decreasing transition probabilities.

Table I

ARGON

| Transition: | $\lambda_{air}$(microns) |
|---|---|
| $2s_2-2p_3$ | 1.3008 |
| $2s_2-2p_2$ | 1.3368 |
| $2s_4-2p_8$ | 1.2456 |
| $2s_4-2p_7$ | 1.3231 |
| $2s_3-2p_4$ | 1.2933 |
| $2s_5-2p_9$ | 1.2488 |
| $2s_5-2p_6$ | 1.3826 |
| $2s_5-2p_{10}$ | 1.0673 |

KRYPTON

| | |
|---|---|
| $2s_2-2p_2$ | 1.3883 |
| $2s_2-2p_3$ | 1.3833 |
| $2s_4-2p_8$ | 1.3177 |
| $2s_4-2p_7$ | 1.4427 |
| $2s_3-2p_4$ | 1.3338 |
| $2s_5-2p_9$ | 1.3634 |
| $2s_5-2p_6$ | 1.5372 |
| $2s_5-2p_{10}$ | 1.1819 |

XENON

| | |
|---|---|
| $2s_2-2p_3$ | 1.7731 |
| $2s_2-2p_2$ | 1.5329 |
| $2s_4-2p_9$ | 1.3657 |
| $2s_4-2p_7$ | 1.5418 |
| $2s_3-2p_4$ | 1.3617 |
| $2s_5-2p_8$ | 1.4733 |
| $2s_5-2p_6$ | 1.6728 |
| $2s_5-2p_{10}$ | 1.2623 |

Figure 7:
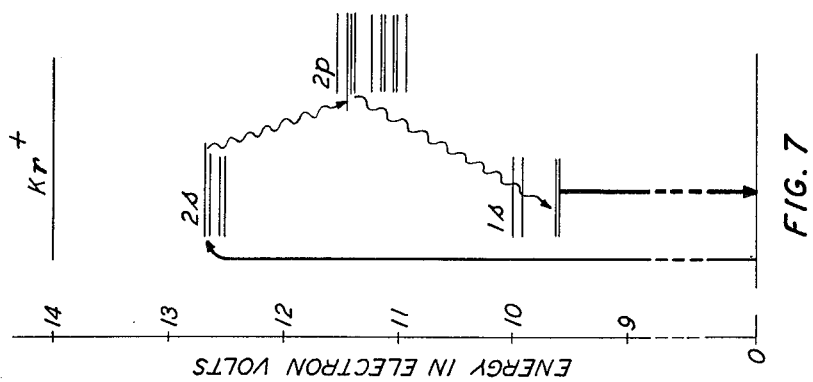
Figure 6:
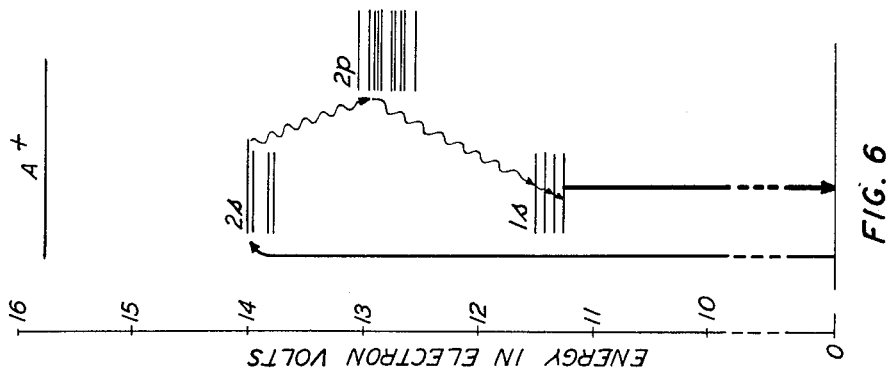

The relevant portions of the energy level systems of argon, krypton and xenon are shown in FIGS. 6, 7 and 8. The main process limiting the magnitude of the various population inversions in each of these gases is the same one described above in detail for the pure neon system. That is, collisions between electrons and gas atoms in the metastable $1s$ state tend to add to the population of the $2p$ levels. The $1s$ level, in accordance with the invention, is depopulated by providing solid interaction surfaces within the gas tube and spaced so as to promote collisions with the metastable particles. Appropriate gas pressures are in the range between about 0.05 mm. and 0.2 mm. of mercury. Optimum wall spacing is about 2 mm.

Many modifications and variations of the invention are possible within the scope of the invention. For example, an additional two-gas maser medium comprises a mixture of neon and oxygen. A population inversion between the $3^3P$ and $3^3S$ levels of atomic oxygen (LS notation) is produced by a two step process. The first step consists of the formation of the metastable $^4\pi_u$ excited state of the $O_2^+$ molecule. This appears to be the result of electron impact as well as of collisions with neon atoms in the metastable $1s$ state. The ground state of $O_2^+$ is a $^2\pi$. The $^4\pi$ state of $O_2^+$ is metastable and is destroyed primarily by collisions. Owing to the proximity of this level to the $3^3P$ and $3^5P$ levels of atomic oxygen, the most probable destruction mechanism involves collison of the excited $O_2^+$ state with an electron. The result is atomic oxygen in either the $3^3P$ of the $3^5P$ state, plus a ground state oxygen atom. The $3^3P$ state is produced in greater abundance and stimulated emission may be achieved between this level and the $3^3S$ which is strongly connected to the ground state of atomic oxygen. This transition is at 0.8446 micron.

Although the invention has been described with particular reference to specific embodiments, these are by way of illustration only. Many other variations may be made by those skilled in the art without departing from the spirit of the invention disclosed herein.

What is claimed is:

1. An optical maser comprising
   a bounded volume,
   a gaseous active medium in said volume,
   said medium having an energy level system characterized by a plurality of distinct energy levels above the ground state,
   means for pumping said medium to establish a population inversion between a pair of said energy levels,
   means defining a light beam path through said medium,
   and means in addition to the simple geometrical bounds of said bounded volume and positioned therewithin to provide extended interaction surfaces in contact with said gaseous medium for selectively suppressing unwanted excitation states.

2. An optical maser as claimed in claim 1 wherein said interaction surfaces are spaced apart by a distance approximately equal to the mean free path in said medium of gas particles in the excitation state to be suppressed.

3. An optical maser as claimed in claim 1 wherein said interaction surfaces are spaced apart by distances between one and four times as great as the mean free path in said medium of gas particles in the excitation states to be suppressed.

4. An optical maser as claimed in claim 1 wherein said medium consists essentially of neon.

5. An optical maser as claimed in claim 1 wherein said medium consists essentially of argon.

6. An optical maser as claimed in claim 1 wherein said medium consists essentially of krypton.

7. An optical maser as claimed in claim 1 wherein said medium consists essentially of xenon.

8. An optical maser as claimed in claim 1 wherein said medium consists essentially of a mixture of neon and oxygen.

9. An optical maser comprising a bounded volume, a gaseous active medium in said volume, said medium having an energy level system which includes a pair of optically coupled energy levels above the ground state and a metastable level intermediate the lower level of said pair and the ground state,
   means for pumping said medium to establish a population inversion between said pair of levels,
   means defining a light beam path through said medium,
   and means in addition to the simple geometrical bounds of said bounded volume and positioned therewithin to provide extended interaction surfaces in contact with said medium for preferentially depopulating with metastable level by collision mechanisms.

10. An optical maser as claimed in claim 8 wherein said interaction surfaces are spaced apart by a distance approximately equal to the mean free path in said medium of gas particles in said metastable state.

11. An optical maser as claimed in claim 5 wherein said interaction surfaces are spaced apart by distances between one and three times as great as the mean free path in said medium of gas particles in said metastable state.

12. An optical maser as claimed in claim 9 wherein said medium consists essentially of neon.

13. An optical maser comprising
   a bounded volume,
   a gaseous active medium in said volume,
   said medium having an energy level system which includes at least three distinct energy levels,
   means for producing free electrons in said medium for colliding with gas particles to establish a population inversion between two of said energy levels,
   means defining a light beam path through said active medium,
   and means positioned within said bounded volume to provide extended intereaction surfaces in contact with said gaseous medium for selectively suppressing an unwanted excitation state,
   said last mentioned means having a relatively small cross-sectional area in a plane transverse to said light beam path, said interaction surfaces being spaced apart by a distance approximately equal to the mean free path of gas particles in the excitation state to be suppressed, said interaction surfaces also being adapted to facilitate coupling between optical wavefronts in the various portions of the light beam path.

14. An optical maser as claimed in claim 13 wherein said interaction surfaces are provided by a plurality of members projecting inward from the boundary of said volume and extending parallel to said light beam path.

15. An optical maser as claimed in claim 13 wherein said interaction surfaces are provided by a plurality of spaced perforated plates, the perforations of adjacent plates being in register.

References Cited in the file of this patent

Javan et al.: "Population Inversion and Continuous Optical Maser Oscillation in a Gas Discharge Containing a He—Ne Mixture," Physical Review Letters, volume 6, No. 3, February 1, 1961, pages 106–110.